(12) United States Patent
Lu et al.

(10) Patent No.: US 11,558,438 B1
(45) Date of Patent: Jan. 17, 2023

(54) STATUS PREDICTION FOR MEETINGS AND PARTICIPANTS

(71) Applicant: INTERNATIONAL BUSINESS MACHINES CORPORATION, Armonk, NY (US)

(72) Inventors: Cindy Han Lu, San Jose, CA (US); Animesh Singh, Santa Clara, CA (US); Tommy Chaoping Li, San Francisco, CA (US); Saishruthi Swaminathan, Sunnyvale, CA (US); Srinivas R. Brahmaroutu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/443,278

(22) Filed: Jul. 23, 2021

(51) Int. Cl.
*H04L 65/4038* (2022.01)
(52) U.S. Cl.
CPC .................. *H04L 65/4038* (2013.01)
(58) Field of Classification Search
CPC combination set(s) only.
See application file for complete search history.

(56) References Cited

U.S. PATENT DOCUMENTS

| | | | |
|---|---|---|---|
| 2017/0353605 A1* | 12/2017 | Dumaine | ............ G06K 9/6267 |
| 2018/0007101 A1 | 1/2018 | Baughman | |
| 2018/0089636 A1 | 3/2018 | Gatzke | |
| 2018/0137472 A1* | 5/2018 | Gorzela | ............... G06Q 10/109 |
| 2021/0056515 A1 | 2/2021 | Misra | |

OTHER PUBLICATIONS

Mell et al., "The NIST Definition of Cloud Computing", National Institute of Standards and Technology, Special Publication 800-145, Sep. 2011, 7 pages.

* cited by examiner

*Primary Examiner* — Amal S Zenati
(74) *Attorney, Agent, or Firm* — David Spalding

(57) ABSTRACT

A computer-implemented method, a computer system and a computer program product generate a custom display for a virtual meeting. The method includes obtaining a plurality of virtual meeting information from a server. The method also includes capturing virtual meeting session data with a device. The virtual meeting session data is selected from a group consisting of audio data, video data and images of a screen of the device. The method further includes determining a current virtual meeting status and a participant emotion based on the virtual meeting session data and the plurality of virtual meeting information. In addition, the method includes predicting a virtual meeting end time and a participant status based on the current virtual meeting status and the participant emotion. Lastly, the method includes displaying the virtual meeting end time and the participant status in a meeting dashboard on the device.

20 Claims, 7 Drawing Sheets

STATUS PREDICTION FOR MEETINGS AND PARTICIPANTS

BACKGROUND

Embodiments relate generally to progress of virtual meetings and, more specifically, to predicting the progress of a virtual meeting and the status of a participant and displaying the results to the participants in a meeting dashboard.

It may be useful to collaborate with others in a professional or personal setting using videotelephony services on the Internet and/or to conduct "virtual meetings". Videotelephony may enable the reception and transmission of audio-video signals by users in different locations, thereby providing a means to communicate video and voice between people in real time. Each meeting participant may communicate a video image of themselves along with audio of their voice using a personal computing device, such as a smart phone, tablet computing device, or personal computer. Each person attending a virtual meeting may participate from any location the person chooses. A person may attend from an office location or from home. Virtual meeting software applications may include a dashboard display with audio and video from participants, as well as information that is relevant about the virtual meeting and its participants.

SUMMARY

An embodiment is directed to a computer-implemented method for generating a custom display for a virtual meeting. The method may include obtaining a plurality of virtual meeting information from a server. The method may also include capturing virtual meeting session data with a device. The virtual meeting session data may be selected from a group consisting of audio data, video data and images of a screen of the device. The method may further include determining a current virtual meeting status based on the virtual meeting session data and the plurality of virtual meeting information. In addition, the method may include determining a participant emotion relative to the current virtual meeting status based on the virtual meeting session data and the plurality of virtual meeting information. The method may also include predicting a virtual meeting end time based on the current virtual meeting status and the participant emotion. The method may further include predicting a participant status based on the current virtual meeting status and the participant emotion. Lastly, the method may include displaying the virtual meeting end time and the participant status in a meeting dashboard on the device.

In another embodiment, the method may include obtaining information about a next meeting from the plurality of virtual meeting information, wherein the information includes a start time and a host for the next meeting. The method may also include determining whether a participant will be present at the start time based on the virtual meeting end time and the participant status. The method may further include determining whether the participant is the host of the next meeting. In addition, the method may include determining a new host for the next meeting, the new host being distinct from the participant, in response to determining that the participant will not be present at the start time and is the host. Lastly, the method may include transferring a host role of the next meeting to the new host.

In a further embodiment, capturing virtual meeting session data may include detecting at least one keyword in captured audio data using speech recognition and natural language processing techniques.

In yet another embodiment, capturing virtual meeting session data may include detecting at least one object or text in captured images of the screen using optical character recognition or object recognition.

In still another embodiment, capturing virtual meeting session data may include detecting a visual cue in captured video using image recognition techniques.

In an embodiment, capturing virtual meeting session data may include determining a tone of voice using a machine learning classification model that predicts tone of voice in spoken audio.

In a further embodiment, determining the participant emotion may include utilizing a machine learning classification model that predicts an emotion of a user in audio or video or text.

In addition to a computer-implemented method, additional embodiments are directed to a system and a computer program product for predicting and displaying virtual meeting and participant status.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

As remote work and global use of collaboration tools become more prevalent, the use of collaboration tools such as video conferencing and virtual meetings may be useful. As with in-person meetings, participants may find it critical to monitor the progress of these virtual meetings and evaluate the value of the participant's contributions and time while managing the participant's daily calendar and maximize productivity.

Virtual meetings may run beyond their allotted time, which also may complicate the ability of participants to transition smoothly between meetings as this may increase the likelihood of a conflict arising between meetings. Transitioning from the current meeting to the next meeting in these conditions may involve multiple manual interventions to allow for communication with participants of both the current meeting and the next meeting for each participant. Participants may need to manage this communication while also focusing on the content of the current meeting and deciding on the relevance or priority of the next meeting. As a result, there may be many disruptions and inefficiencies in both the current and next meeting on a participant's calendar at these transition times. Examples of such disruptions in the current meeting are multiple participants interrupting a presentation to say "I have a hard stop" or "I only have 10 minutes available" or "I have to stop in 15 minutes".

In the next meeting, the participant may need to communicate with the host or another participant to inform them that they will be late, or if not, the participants or host of the next meeting may have to wait for that person to join the next meeting, depending on their importance to the meeting topic. The manual process of managing both the current and upcoming meetings may be cumbersome on a participant and take away from their attention on the meeting objective, as well as disrupt the focus of all participants with the manual disruptions. What is needed is a method to detect and predict when a meeting may end, i.e., meeting progress, and participant status for the purpose of automatically displaying that information to the hosts and participants of the current meeting and the next meeting on a participant's calendar. Such a method may improve the technical capability of virtual meeting software applications and enhance professional and personal productivity.

Figure 1:
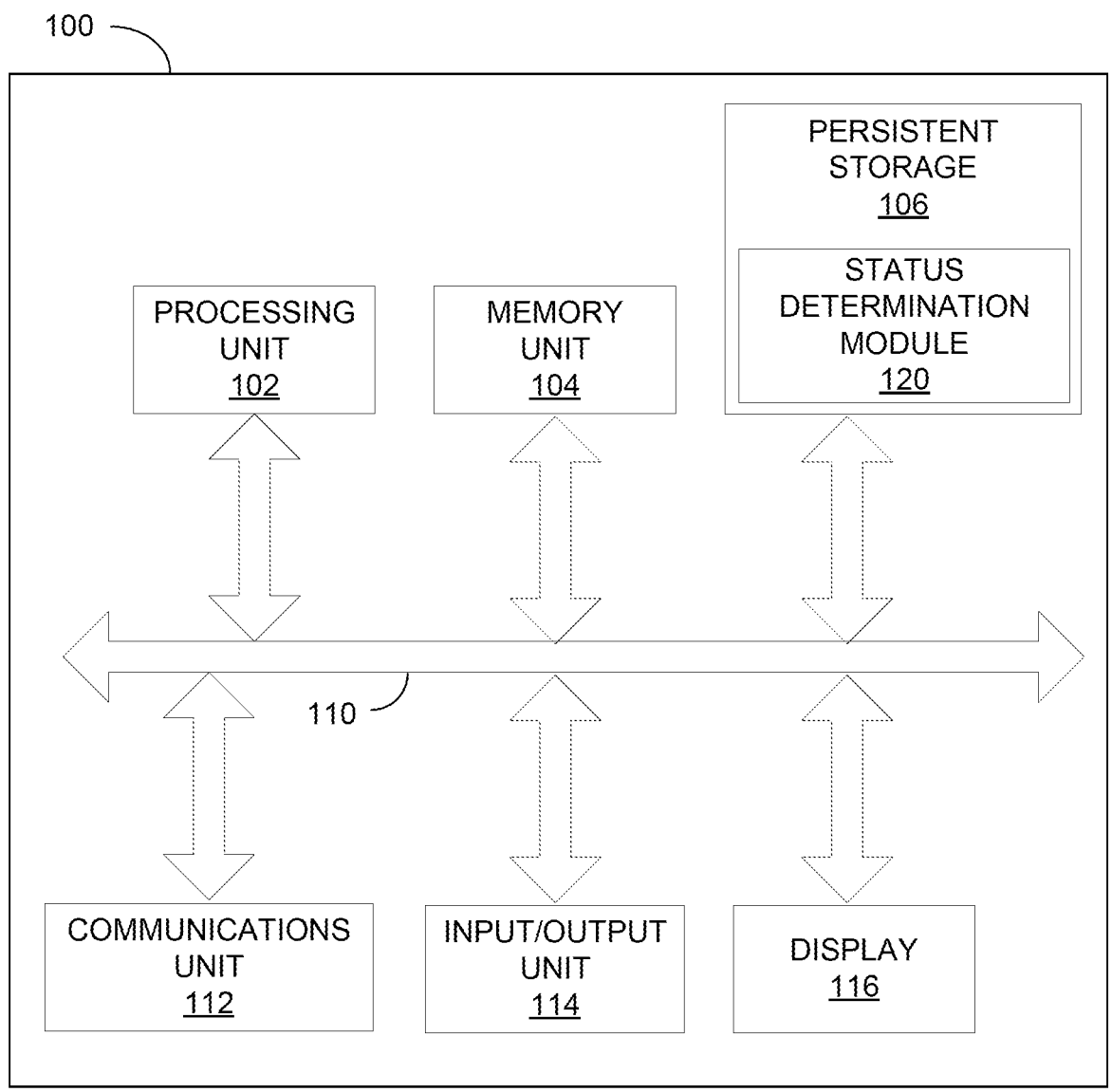
FIG. 1 depicts a block diagram of internal and external components of the computers and servers depicted in FIG. 2, according to at least one embodiment.
Figure 2:
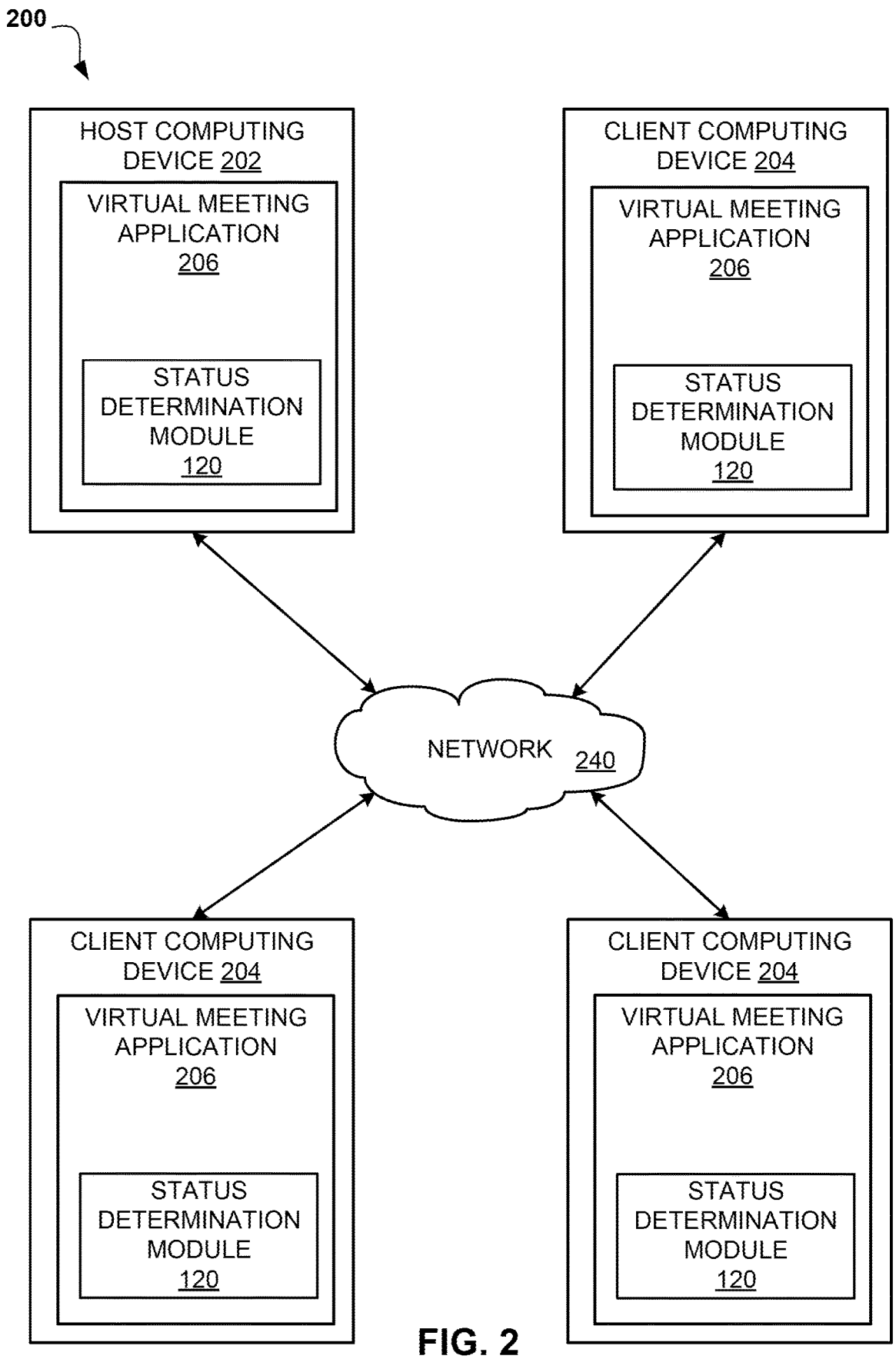
FIG. 2 depicts a block diagram of a computing system that may be used to set up and conduct a virtual meeting over the network, according to an exemplary embodiment.

Referring to FIG. 1, a block diagram is depicted illustrating a computer system 100 which may be embedded in the host computing device 202 or client computing device 204 depicted in FIG. 2 in accordance with an embodiment. It should be appreciated that FIG. 1 provides only an illustration of one implementation and does not imply any limitations with regard to the environments in which different embodiments may be implemented. Many modifications to the depicted environments may be made based on design and implementation requirements.

As shown, a computer system 100 may include a processor unit 102, a memory unit 104, a persistent storage 106, a communications unit 112, an input/output unit 114, a display 116, and a system bus 110. Computer programs such as the status determination module 120 may be typically stored in the persistent storage 106 until they are needed for execution, at which time the programs may be brought into the memory unit 104 so that they can be directly accessed by the processor unit 102. The processor unit 102 may select a part of memory unit 104 to read and/or write by using an address that the processor 102 may give to the memory unit 104 along with a request to read and/or write. Usually, the reading and interpretation of an encoded instruction at an address may cause the processor 102 to fetch a subsequent instruction, either at a subsequent address or some other address. The processor unit 102, memory unit 104, persistent storage 106, communications unit 112, input/output unit 114, and display 116 may interface with each other through the system bus 110.

Examples of computing systems, environments, and/or configurations that may be represented by the data processing system 100 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Each computing system 100 may also include a communications unit 112 such as TCP/IP adapter cards, wireless Wi-Fi interface cards, or 3G or 4G wireless interface cards or other wired or wireless communication links. The status determination module 120 and the virtual meeting application 206 in a host computing device 202 or client computing device 204 may communicate with external computers via a network (for example, the Internet, a local area network or other wide area network) and respective network adapters or interfaces 112. From the network adapters or interfaces 112, the status determination module 120 and the virtual meeting application 206 in the server may be loaded into the respective persistent storage 106.

Referring to FIG. 2, a block diagram of a computing system that may be used to conduct a virtual meeting is depicted, according to at least one embodiment. The networked computer environment 200 may include a meeting host computing device 202 and one or more client computing devices 204, interconnected via a communication network 240. According to at least one implementation, the networked computer environment 200 may include a plurality of client computing devices 204 of which only three are shown for illustrative brevity. In the configuration shown in FIG. 2, a single meeting host may have overall control over the virtual meeting session, including which participants may connect to the session, but any of the devices in the session may contribute to the virtual meeting session, including sharing their computer screen or participating in a chat session or any other features that may be provided by the virtual meeting application 206. One of ordinary skill in the art will recognize that a virtual meeting application 206 is not necessary for a virtual meeting session to be established. It is only required that a group of participants are connected to one another for the purpose of collaboration. In addition, it should be noted that the host or client designation for the computing device is only significant in establishing the virtual meeting session. Once a session has begun, the host computing device 202 and client computing device 204 are functionally identical with regard to contributions to the virtual meeting session and all operators of computing devices within the virtual meeting session may be referred to as participants.

The communication network 240 may include various types of communication networks, such as a wide area network (WAN), local area network (LAN), a telecommunication network, a wireless network, a public switched network and/or a satellite network. The communication network 240 may include connections, such as wire, wireless communication links, or fiber optic cables. The network 240 may also include additional hardware not shown such as routers, firewalls, switches, gateway computers and/or edge servers. It may be appreciated that FIG. 2 provides only an illustration of one implementation and does not imply any limitations with regard to the environments in which different embodiments may be implemented. Many modifications to the depicted environments may be made based on design and implementation requirements. Accordingly, the communication network 240 may represent any communication pathway between the various components of the networked computer environment 200.

The host computing device 202 or client computing device 204 may be a mobile device, telephone, personal digital assistant (PDA), laptop computer, netbook computer, tablet computer, personal computer (PC), a desktop computer, or any programmable electronic device or any network of programmable electronic devices capable of hosting and running the virtual meeting application 206. As discussed with reference to FIG. 1, host computing device 202 and client computing device 204 may include computing system 100.

Host computing device 202 or client computing device 204 may include a virtual meeting application 206 that is configured to communicate with other virtual meeting computer devices via the communication network 240, in accordance with an exemplary embodiment. The virtual meeting application 206 may provide a user interface in which a virtual meeting participant utilizing the computing device may view other participants in the virtual meeting, as well as receive a screen image that is shared by another participant, according to the exemplary embodiments.

The status determination module 120 may operate in tandem with the virtual meeting application 206 on either the host computing device 202 or the client computing device 204 in the configuration shown in FIG. 2. The module may be discrete software that is separately loaded into the computing device or may be embedded within the virtual meeting application 206 at the computing device. It will be appreciated by one of ordinary skill in the art that while the status determination module 120 operates at a computing device, it is not required that the software is physically loaded or installed on the hardware but may be on a server for the virtual meeting session. The same is true for the virtual meeting application 206 itself as the virtual meeting session may be fully in the cloud and hosted by a virtual meeting server that is not shown.

The host computing device 202 may communicate with the client computing devices 204 via the communication network 240, in accordance with embodiments of the invention. As will be discussed with reference to FIGS. 6 and 7, the virtual meeting application 206 running a virtual meeting on the host computing device 202 and client computing device 204 may also operate in a cloud computing service model, such as Software as a Service (SaaS), Platform as a Service (PaaS), or Infrastructure as a Service (IaaS). The servers running the virtual meeting application 206 on the devices participating in the virtual meeting may also be located in a cloud computing deployment model, such as a private cloud, community cloud, public cloud, or hybrid cloud.

Figure 3:
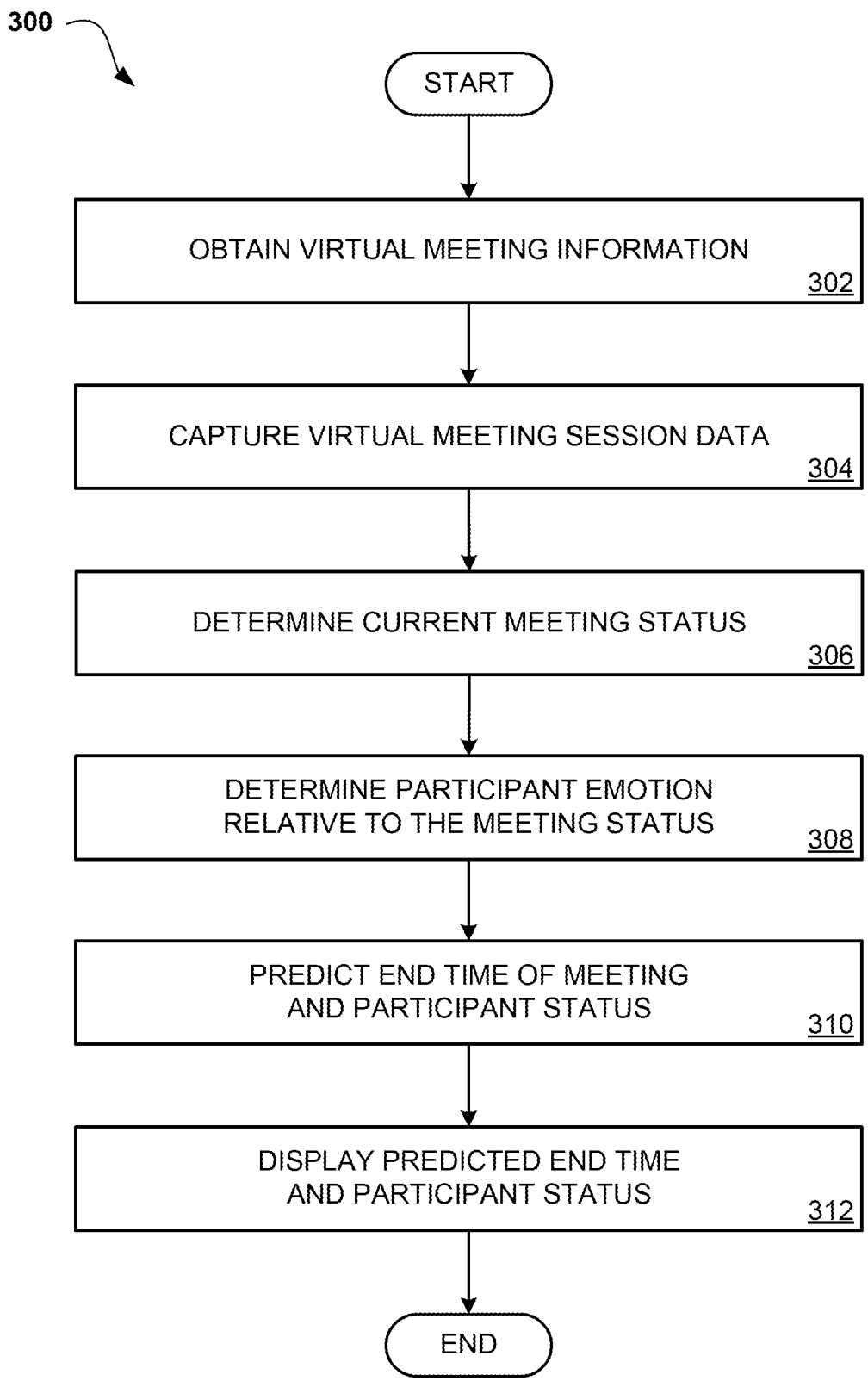
FIG. 3 depicts a flow chart diagram of a process to predict and display virtual meeting progress and participant status in accordance with one or more embodiments.

Referring to FIG. 3, an operational flowchart illustrating a process 300 for predicting and displaying virtual meeting progress and participant status is depicted according to at least one embodiment. At 302, stored information regarding the virtual meeting and the meeting participants, i.e., virtual meeting information, may be obtained from a server. It should be noted that it is not required for obtaining virtual meeting information to occur at any specific time. The information may be obtained before the meeting or once the meeting session has started. The data to be obtained may include calendar information for the meeting, e.g., scheduled time and date along with duration, meeting agenda and topics, a meeting type such as a discussion or brainstorming session. In addition, obtaining virtual meeting information may take multiple forms. For instance, the invitation list for the virtual meeting may be scanned to identify the participants in the meeting or alternatively, any person who is actively connected to the virtual meeting may be identified as a participant. It is not required that the virtual meeting information come from a specific source.

Included within the virtual meeting information may be detailed information about each participant such as a job role, including a position in the hierarchy of the organization. This information may be put into a participant profile which may include details regarding the participant's relevance to the topic under discussion at the meeting. As an example, if the participant is identified as occupying a high level within the organization that includes a majority of the participants, that participant may be identified as needing to make critical decisions related to the meeting topic, such as commitment of resources to a project or even whether a project being discussed should continue. In such an event, that participant's presence at the meeting would be required for the virtual meeting session to continue. A participant profile may also include details about the participant's meeting calendar, including details about meetings immediately following the current meeting on the calendar. For instance, the importance of the next meeting on the calendar may be determined and if the next meeting is of high importance, or if the end time of the meeting coincides with the end of the day or a need to sign off from work, then it may be noted that the participant cannot stay connected to the meeting after the end time. In addition, it may be determined that the participant is the host of the next meeting, which would mean that should the current meeting continue past its scheduled end time, participants of the next meeting must be notified and a new host may be selected to take over if necessary. The information about the participant, as well as the entirety of the virtual meeting information, may be stored in a database for use in the prediction process described below and it is not required that a formal profile is created.

At 304, once the meeting has started and a virtual meeting session has been established, real-time monitoring of the virtual meeting session may be conducted to capture virtual meeting session data, consisting of information about the current progress of the virtual meeting and its participants. One of ordinary skill in the art will recognize that a virtual meeting session is commonly started and run through a virtual meeting application, but this is not required. A virtual meeting session may be any forum that connects one or more participants to each other in a collaborative way, such that topics may be discussed and audio and video may be transmitted to and received by all participants, along with the other potential tools described herein. Examples of real-time monitoring may include gathering video of the participants from a camera and/or extracting images or capturing audio from a microphone. Other examples of real-time monitoring may be capturing contemporaneous chat conversations, either through a chat function embedded within the virtual meeting application or external to the virtual meeting software on participant computers or taking a screen shot of a participant's computer. One of ordinary skill in the art will recognize that the camera or microphone or other device may be present in the local environment of the participant but may not be required to come directly from these devices. A virtual meeting application may have video and audio embedded within it, as well as an image of a participant's computer screen. It is also not required that the devices that capture the virtual meeting session connect directly to a device in the virtual meeting session or running a virtual meeting application. Mobile devices that are connected to the participants may also be used to capture the virtual meeting session and text, e.g., SMS, conversations on mobile devices may also be scanned.

It is important to note that any real-time monitoring of a virtual meeting session as mentioned herein requires the informed consent of all those people whose audio, video and text conversations are captured for analysis. Consent may be obtained in real time or through a prior waiver or other process that informs a subject that their voice may be captured by a microphone or image captured by a camera or other sensitive personal data may be gathered through any means and that this data may be analyzed by any of the many algorithms, including natural language processing, that are mentioned below. A user may opt out of any portion of the real-time monitoring at any time.

At 306, the virtual meeting information obtained in 302 may be combined with analysis of the virtual meeting session data to determine current meeting status. This status may be the progress of the meeting, such as the current topic under discussion and that topic's position in the meeting agenda. For instance, if the first topic on the agenda is still being discussed after half of the allotted meeting time has elapsed, this may lead to a prediction of a meeting end time that is well past the scheduled end time.

The current meeting status may also include relative priority or importance of the topic as an indicator of the expected end time for the meeting. As an example, if the meeting occurs close to a project deadline or milestone, discussing the progress that has been made toward that goal may be critical to the goals of the meeting. If the specific deadline or milestone is the current discussion topic, that may affect the prediction of the end time for the meeting, especially if the scheduled end time is close. This may also affect the attention level and interest of specific participants or the group in general and therefore, the determination of their emotions and general status of individual participants. Another indication of the priority or importance of a discussion topic may be the type of information that is being shared between participants and captured in the virtual meeting session data. If serious substantive material that is related to the overall meeting topic as determined from the virtual meeting information being discussed, that may indicate a longer remaining duration than an abundance of conversation about family or common hobbies and the like. In the same way, if the topic currently being discussed has been determined to be of low priority, then this may also indicate a short remaining duration.

In addition to determining a priority from the content of the conversation in the virtual meeting session data, a priority may be assigned by a meeting host to the anticipated discussion topics that may be marked and extracted from the virtual meeting information that is obtained in 302. Such a designation to topics within a meeting may also be extended to the meeting itself. For instance, a participant may indicate on their calendar whether a meeting is considered by them to be high or low priority. This may help the participant to manage their participation and affect both the meeting and participant status predictions. If a necessary participant has designated a topic or meeting as low priority and exited the session, this may force the overall session to be terminated without that participant. Similarly, if the participant has marked the current meeting as high priority, it may force the next meeting on that participant's calendar to start late or begin without that participant, as explained further below.

At 308, an individual participant emotion may also be determined through analysis of the virtual meeting session data. In an embodiment, a supervised machine learning classification model may be trained to predict the emotion or state of mind of individual participants. One or more of the following machine learning algorithms may be used: logistic regression, naive Bayes, support vector machines, deep neural networks, random forest, decision tree, gradient-boosted tree, multilayer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include any of the types of data, e.g., images from meeting videos or audio from meeting participants, that have been captured in the virtual meeting session data above. The training data may be captured from a single user or a group of users, with user consent required prior to data capture. The classification results may be stored in a database so that the data may be most current, and the output would always be up to date.

In both 306 and 308, to determine a meeting topic and participant emotion, any of several techniques may be used to analyze the virtual meeting session data that has been captured. For instance, image recognition algorithms may be used with extracted images from the captured video of the meeting session to determine specific body language or other known visual cues such as facial expressions or eye movements to determine a participant's level of interest at any given time during the meeting session. In the same way, any text conversation that may be captured in the course of the virtual meeting session may be analyzed for content that may indicate a participant's emotion or interest in the current meeting topic.

Similarly, using techniques such as optical character recognition (OCR) or object recognition algorithms, the current image on the screens of the currently connected participants may be detected and analyzed for relevant content. For instance, the agenda of the meeting may be displayed with an indicator of which topic is being discussed and because the monitoring may be done in real time, the agenda may be tracked to determine items that have already been discussed and those that will be discussed later. The result of the scan may be a text representation of the image on the participant computing device that may be used to find documents that may be accessible to the participant computing device. However, it is not necessary that a text representation be generated. Since object recognition techniques may be employed at this step, it may also be possible to identify similar documents from visuals or colors. For example, if multiple different types of files are shared on the screen, the different types of documents may be distinguished using those visuals or colors.

Automatic speech recognition (ASR) techniques in conjunction with speech-to-text (STT) algorithms may also be used to analyze the captured audio from the virtual meeting session to determine meeting progress. For instance, certain spoken keywords or phrases, such as "OK, sounds good. We will schedule a follow-up call" or "I have one more question. Can we take a minute to discuss it?", may indicate which topic is being discussed or whether the meeting has reached the end (or not) of one topic or the beginning of another topic. At the same time, natural language processing (NLP) algorithms may also be used on the captured audio to determine a tone of voice or inflection in use during the course of the session, which may be useful in determining the emotion of the speaker, since a downward inflection in the tone of participants' voice(s) may indicate that the meeting is moving towards an ending of a specific topic or the meeting as a whole.

The tone of voice or inflection of a participant may also be useful in determining a participant emotion. In an embodiment, a supervised machine learning classification model may be trained to predict the tone or inflection of the voice in spoken audio. One or more of the following machine learning algorithms may be used: logistic regression, naive Bayes, support vector machines, deep neural networks, random forest, decision tree, gradient-boosted tree, multilayer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include several audio samples from a variety of users expressing various inflections and tones of voice. The training data may be captured from a single user or a group of users, with user consent required prior to capture. The classification results may be stored in a database so that the data is most current, and the output would always be up to date.

One of ordinary skill in the art will recognize that there may be multiple machine learning models used throughout the process and the training data for these models may be shared between the models or not. In addition, the same model may be used to generate multiple predictions. As an example, a determination of a tone of voice or inflection may use the same model as a determination of participant emotion. It is not required that every machine learning model is separate or that they are combined, other than incompatible model types, for instance a classification model would not be used for a result that is not a classification.

At 310, the virtual meeting information that has been gathered, along with the results of the determinations of current meeting status and participant emotions for the current meeting session, may be combined to predict an end time for the virtual meeting session, which may be understood as the progress of the meeting. In addition, a likelihood that each remaining participant will stay connected to the meeting beyond the scheduled end time or the predicted end time for the virtual meeting session may be determined, which may be understood as the participant status. As an example, if a participant has a high-priority meeting scheduled immediately after the current meeting, or if they must leave their current location at a specific time, the likelihood of staying connected may be very low. However, if it is determined that the scheduled end time has been reached and the participants are close to a resolution or decision that may be worth staying for a few remaining minutes, there may be a higher likelihood of the group staying together beyond the scheduled end time. Similarly, if a participant is determined to be restless or lacks focus on the current topic, that participant may be likely to drop off the virtual meeting session even if the prediction for the remaining length of the meeting may be significantly high.

At 312, the results of the meeting end time prediction and the determined participant status may be displayed to the participants in the virtual meeting in the form of a meeting dashboard. If the virtual meeting session is being hosted in a virtual meeting application, the virtual meeting dashboard may appear in the virtual meeting application window in which the meeting is being hosted or in a separate window that may be created for the purpose of the virtual meeting dashboard. Each participant may configure their virtual meeting dashboard individually. For instance, a meeting host may wish to see the meeting progress and the participant status for each participant in the meeting or only a subset of the participants, while an individual participant may only wish to see the meeting progress and not the status of individual participants. In addition to the current meeting, hosts or participants of those meetings that are immediately after the current meeting on a participant's calendar may also be included in the notification and shown their own virtual meeting dashboard. For instance, if a participant has a meeting immediately following the current meeting, i.e., a next meeting, and it is likely that the participant will be late, any participants in the next meeting may wish to be informed of that participant's status such that the agenda of the next meeting may be adjusted to delay a meeting topic in the agenda to which that participant may contribute to a later time. In another embodiment, if that delayed participant is the host of the next meeting, the host role may be transferred to a backup participant to begin the next meeting, as discussed in detail in FIG. 4 below. Alternatively, the starting time of the next meeting may be changed to accommodate the needs of the participant.

Figure 4:
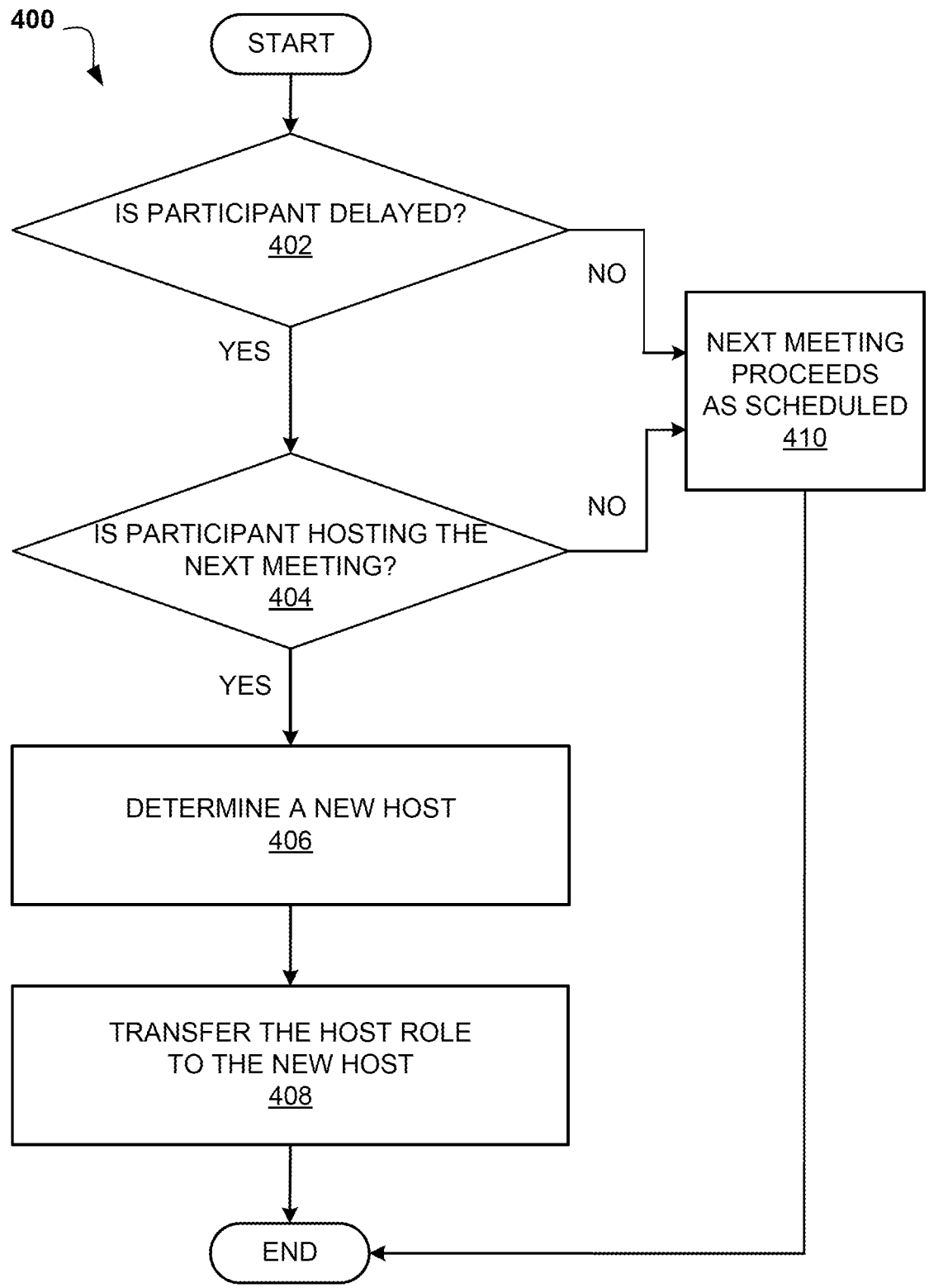
FIG. 4 depicts a flow chart diagram of a process to transfer the host role of a next meeting in accordance with one or more embodiments.

Referring now to FIG. 4, an operational flowchart illustrating a process 400 for transferring the host role of a next meeting is depicted according to at least one embodiment. At 402, the status determination module 120 may determine from the predictions of meeting progress and participant status whether a participant is delayed and unable to join the next meeting on the calendar at the scheduled start time. As described with respect to FIG. 3, meeting progress may show the predicted end time for the current meeting to be after the start time of the next meeting and, based on the participant status, that a participant may be expected to remain connected to the current meeting until the predicted end time. In such an instance, the next meeting on the participant's calendar may need to be adjusted to accommodate the participant's current status. As mentioned above, the participants of the next meeting may be informed of the participant status and the next meeting agenda may be changed to allow for a possible schedule change. The next meeting may proceed as scheduled at 410, described below, if the participant is not delayed in the current meeting according to the meeting progress and participant status predicted above.

At 404, if the participant is predicted to be delayed in 402, the status determination module 120 may determine from the virtual meeting information related to the participant, mainly the participant's calendar, whether the participant is the host of the next meeting. A participant may be considered the host of the meeting if the participant initially scheduled the meeting or, in an embodiment, if the virtual meeting application 206 is tied to the participant's account. This host role may carry the responsibility of initiating the virtual meeting session or otherwise exercising control over the virtual meeting session. If the participant is delayed, then they may be unable to perform these duties and for the meeting to begin at the scheduled start time, the host role may need to be transferred to a new host. The next meeting may proceed as scheduled at 410, described below, if the participant is not the host of the next meeting on the participant's calendar according to the virtual meeting information that was gathered in 302.

At 406, if a participant is both predicted to be delayed in 402 and to be the host of the next meeting on the participant's calendar in 404, then a new host may be determined. One of ordinary skill in the art will recognize that there may be multiple ways to determine a new host. The participant list of the next meeting may be gathered from the virtual meeting information and a new host may be identified from the organization chart of the department, e.g., an assistant or the next level above or below the participant, or from a history of other meetings where a new host may have been identified. It may only be necessary to identify another participant who may be available to become the host of the next meeting should the participant not be able to start the next meeting.

At 408, once a new host has been determined, the host role may be transferred to the new host. As mentioned previously, the host role may be a designation or, in an embodiment, function within the virtual meeting application 206 or may be anything that identifies the person so designated as the host and in control of the virtual meeting session, which may include initiating the session and organizing the participants. The host may also be a presenter and share their screen first or have the details of the meeting that can be shared among all participants. This host role may also be displayed in the meeting dashboard that was created in connection with FIG. 3 or on a screen related to the virtual meeting application 206. As mentioned above, it may not be necessary for a screen sharing session to use a virtual meeting application 206 but rather that a virtual meeting session have a host that needs to be changed due to the predictions of meeting progress and participant status.

At 410, as already mentioned, if the predictions of meeting progress and participant status determine that a participant will be able to start the next meeting on time or if a participant that is determined to be delayed is not the host of the next meeting, then no action may be taken by the process 400 and the next meeting may proceed as scheduled.

Figure 5:
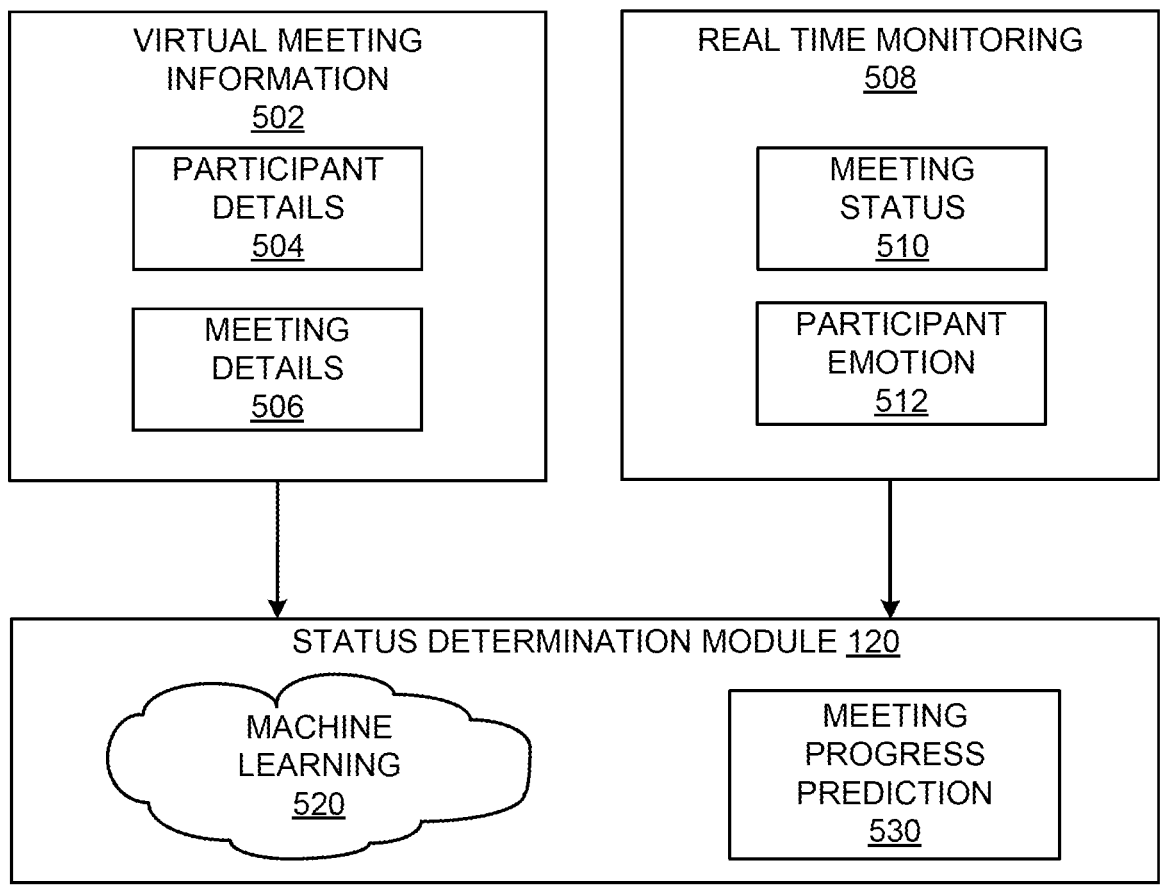
FIG. 5 depicts a block diagram of the inputs and machine learning model of a process for predicting virtual meeting progress and participant status according to an embodiment.

Referring now to FIG. 5, a diagram showing examples of components or modules of a process to generate a prediction of progress in a virtual meeting session according to at least one embodiment. One of ordinary skill in the art would recognize that similar logic may be used for the other machine learning models that may be used in other embodiments. For instance, virtual meeting information 502 and real-time monitoring 508 may also be the inputs to a supervised machine learning classification model used for determining participant emotion 512 but the output of that model would be a participant emotion instead of a prediction of meeting progress 530 as described below.

According to one embodiment, the process may include status determination module 120 which utilizes supervised machine learning 520 to determine meeting progress 530. The supervised machine learning model may use an appropriate machine learning algorithm, e.g., Support Vector Machines (SVM) or random forests. The status determination module 120 may receive virtual meeting information 502 such as participant details 504 and meeting details 506 and also use virtual meeting session data to track the virtual meeting session and the participants through real time monitoring 508, which includes a meeting status 510 and participant emotion 512 for use by the status determination module 120. The status determination module 120 may use the above information to determine meeting progress and, while an initial prediction may be generated directly from the meeting details 506, e.g., the scheduled end time may be the initial prediction for the actual end time, the process may update its prediction in real time as the meeting status 510 and participant emotion 512 inputs change. For example, it may be discovered that the meeting is moving exceptionally fast through the agenda or that one participant is not present to contribute to a specific meeting topic and the status determination module 120 may adjust to any change and update its prediction of meeting progress.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
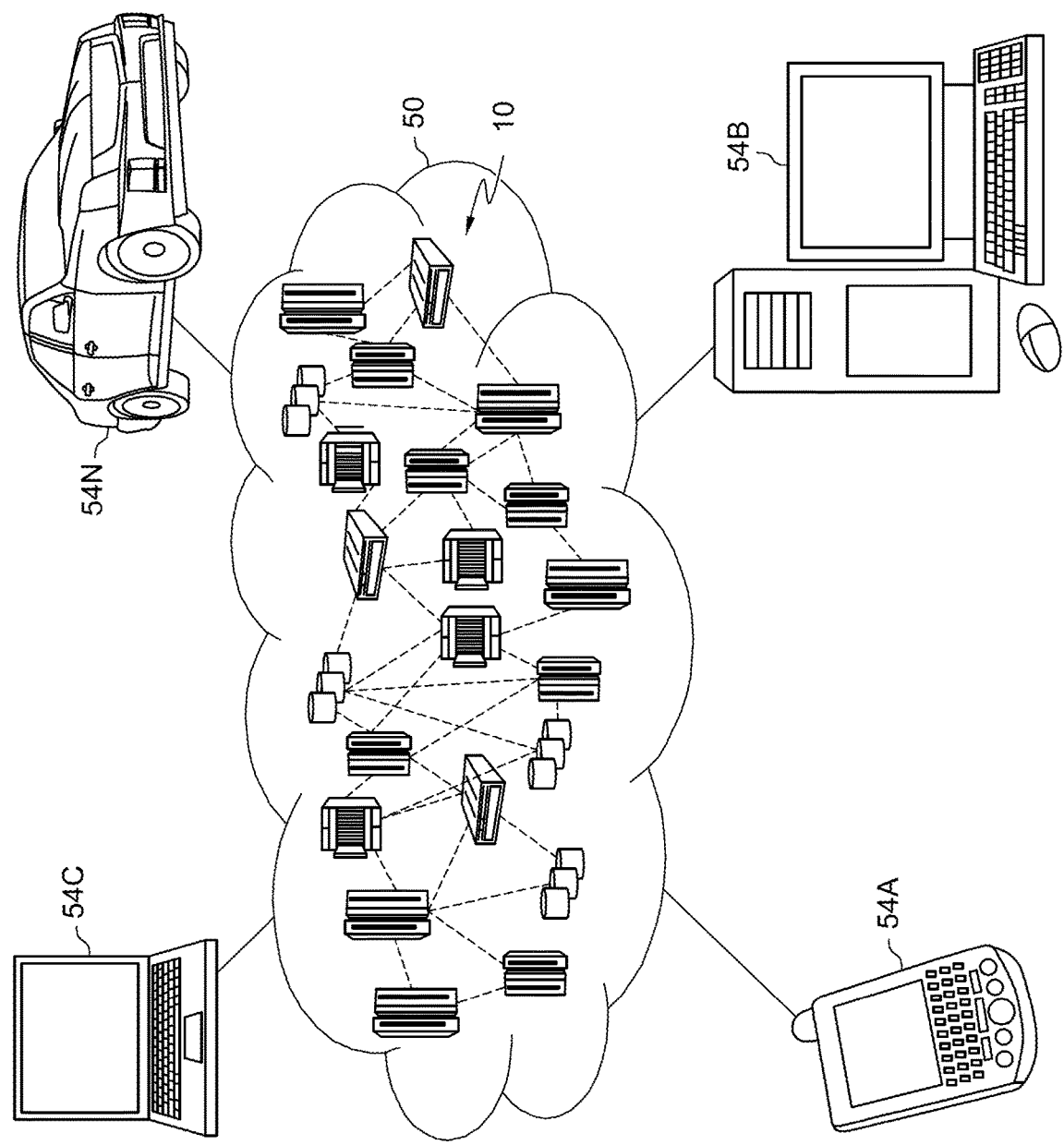
FIG. 6 depicts a cloud computing environment according to an embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
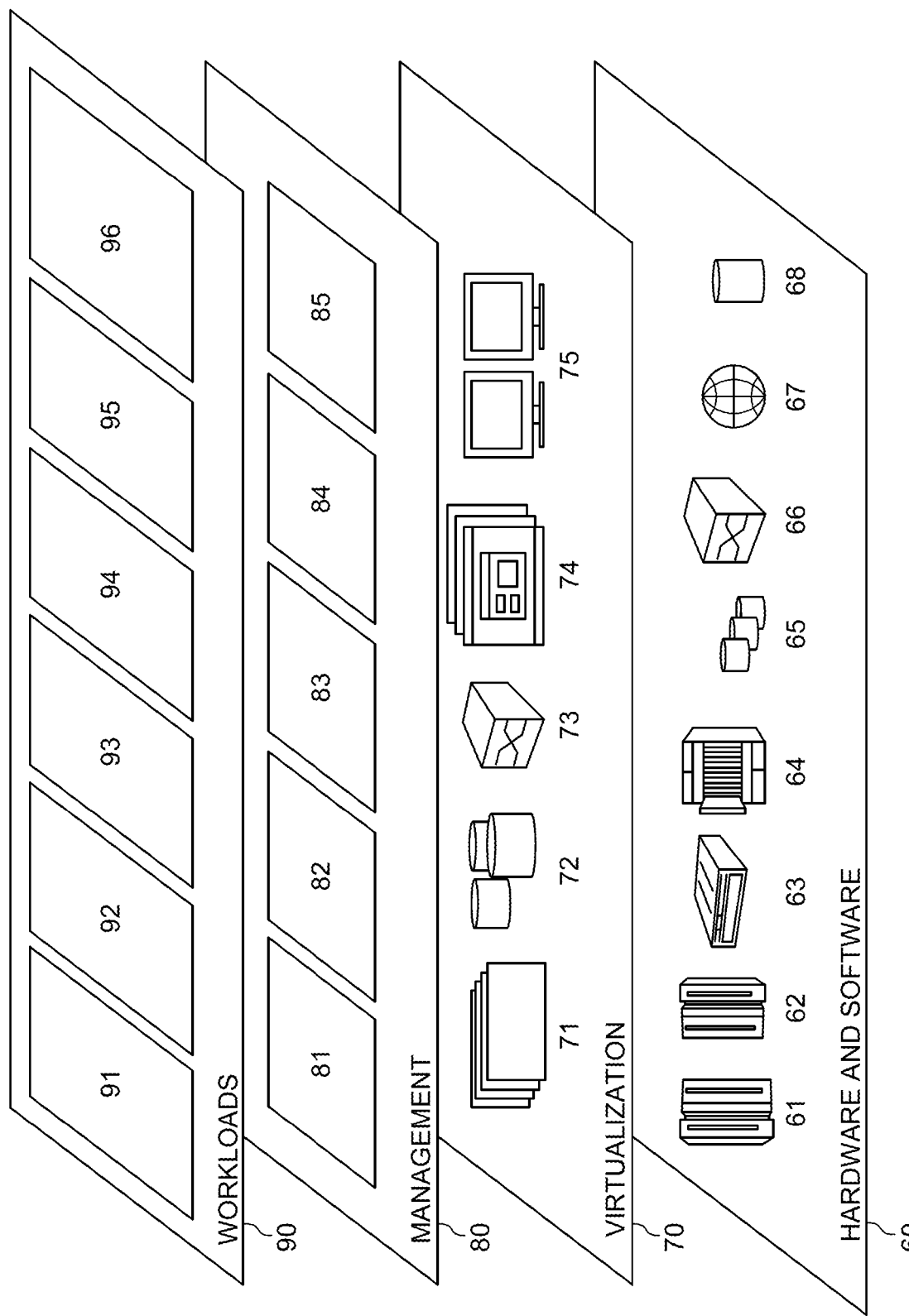
FIG. 7 depicts abstraction model layers according to an embodiment.

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and virtual meeting status determination 96. Virtual meeting status determination may relate to predicting and displaying virtual meeting progress and participant status.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a custom display for a virtual meeting, the method comprising:

obtaining virtual meeting information from a server, wherein the virtual meeting information includes an agenda of the virtual meeting;

capturing virtual meeting session data with a device, wherein the virtual meeting session data is selected from a group consisting of audio data, video data and images of a screen of the device;

determining progress of the virtual meeting by comparing the virtual meeting session data and the agenda of the virtual meeting;

determining a participant emotion relative to the progress of the virtual meeting based on the virtual meeting session data and the virtual meeting information;

determining a virtual meeting end time and a participant status based on the progress of the virtual meeting and the participant emotion; and displaying a meeting dashboard on the device, wherein the meeting dashboard includes the virtual meeting end time and the participant status.

2. The computer-implemented method of claim 1, further comprising:

obtaining information about a next meeting from the virtual meeting information, wherein the information includes a start time and a host for the next meeting;

determining that a participant will not be present at the start time based on the virtual meeting end time and the participant status;

determining that the participant is the host of the next meeting;

identifying a new host for the next meeting, the new host being distinct from the participant; and transferring a host role of the next meeting to the new host.

3. The computer-implemented method of claim 1, wherein capturing the virtual meeting session data further comprises detecting at least one keyword in captured audio data using speech recognition and natural language processing techniques.

4. The computer-implemented method of claim 1, wherein capturing the virtual meeting session data further comprises detecting at least one object or text in captured images of the screen using optical character recognition or object recognition.

5. The computer-implemented method of claim 1, wherein capturing the virtual meeting session data further comprises detecting a visual cue in captured video using image recognition techniques.

6. The computer-implemented method of claim 1, wherein capturing the virtual meeting session data further comprises determining a tone of voice using a machine learning classification model that predicts tone of voice in spoken audio.

7. The computer-implemented method of claim 1, wherein determining the participant emotion further comprises utilizing a machine learning classification model that predicts an emotion of a user in audio or video or text.

8. A computer system for generating a custom display for a virtual meeting, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
obtaining virtual meeting information from a server, wherein the virtual meeting information includes an agenda of the virtual meeting;
capturing virtual meeting session data with a device, wherein the virtual meeting session data is selected from a group consisting of audio data, video data and images of a screen of the device;
determining progress of the virtual meeting by comparing the virtual meeting session data and the agenda of the virtual meeting;
determining a participant emotion relative to the progress of the virtual meeting based on the virtual meeting session data and the virtual meeting information;
determining a virtual meeting end time and a participant status based on the progress of the virtual meeting and the participant emotion; and
displaying a meeting dashboard on the device, wherein the meeting dashboard includes the virtual meeting end time and the participant status.

9. The computer system of claim 8, further comprising:
obtaining information about a next meeting from the virtual meeting information, wherein the information includes a start time and a host for the next meeting;
determining that a participant will not be present at the start time based on the virtual meeting end time and the participant status;
determining that the participant is the host of the next meeting;
identifying a new host for the next meeting, the new host being distinct from the participant; and
transferring a host role of the next meeting to the new host.

10. The computer system of claim 8, wherein capturing the virtual meeting session data further comprises detecting at least one keyword in captured audio data using speech recognition and natural language processing techniques.

11. The computer system of claim 8, wherein capturing the virtual meeting session data further comprises detecting at least one object or text in captured images using optical character recognition or object recognition.

12. The computer system of claim 8, wherein capturing the virtual meeting session data further comprises detecting a visual cue in captured video using image recognition techniques.

13. The computer system of claim 8, wherein capturing the virtual meeting session data further comprises determining a tone of voice using a machine learning classification model that predicts tone of voice in spoken audio.

14. The computer system of claim 8, wherein determining the participant emotion further comprises utilizing a machine learning classification model that predicts an emotion of a user in audio or video or text.

15. A computer program product for generating a custom display for a virtual meeting, the computer program product comprising:
a computer readable storage device having program instructions embodied therewith, the program instructions executable by a processor to cause the processor to perform a method comprising:
obtaining virtual meeting information from a server, wherein the virtual meeting information includes an agenda of the virtual meeting;
capturing virtual meeting session data with a device, wherein the virtual meeting session data is selected from a group consisting of audio data, video data and images of a screen of the device;
determining progress of the virtual meeting by comparing the virtual meeting session data and the agenda of the virtual meeting;
determining a participant emotion relative to the progress of the virtual meeting based on the virtual meeting session data and the plurality of virtual meeting information;
determining a virtual meeting end time and a participant status based on the progress of the virtual meeting and the participant emotion; and
displaying a meeting dashboard on the device, wherein the meeting dashboard includes the virtual meeting end time and the participant status.

16. The computer program product of claim 15, further comprising:
obtaining information about a next meeting from the virtual meeting information, wherein the information includes a start time and a host for the next meeting;
determining that a participant will not be present at the start time based on the virtual meeting end time and the participant status;
determining that the participant is the host of the next meeting;
identifying a new host for the next meeting, the new host being distinct from the participant; and
transferring a host role of the next meeting to the new host.

17. The computer program product of claim 15, wherein capturing the virtual meeting session data further comprises detecting at least one keyword in captured audio data using speech recognition and natural language processing techniques.

18. The computer program product of claim 15, wherein capturing the virtual meeting session data further comprises detecting at least one object or text in captured images using optical character recognition or object recognition.

19. The computer program product of claim 15, wherein capturing the virtual meeting session data further comprises determining a tone of voice using a machine learning classification model that predicts tone of voice in spoken audio.

20. The computer program product of claim 15, wherein determining the participant emotion further comprises utilizing a machine learning classification model that predicts an emotion of a user in audio or video or text.

* * * * *